US008145992B2

(12) United States Patent  
Jacquin et al.

(10) Patent No.: US 8,145,992 B2  
(45) Date of Patent: Mar. 27, 2012

(54) VALIDATION ASSISTED DOCUMENT CONVERSION DESIGN

(75) Inventors: Thierry Jacquin, Gieres (FR); Jean-Pierre Chanod, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 940 days.

(21) Appl. No.: 12/164,479

(22) Filed: Jun. 30, 2008

(65) Prior Publication Data

US 2009/0327874 A1 Dec. 31, 2009

(51) Int. Cl.
*G06F 17/27* (2006.01)

(52) U.S. Cl. ........ 715/237; 715/229; 715/239; 715/241; 717/151; 717/152; 717/153; 717/154; 717/155; 717/156

(58) Field of Classification Search .................. 715/229, 715/237, 239, 241; 717/151–156
See application file for complete search history.

(56) References Cited

U.S. PATENT DOCUMENTS

| | | | | |
|---|---|---|---|---|
| 6,560,620 | B1 * | 5/2003 | Ching | 715/229 |
| 6,741,990 | B2 * | 5/2004 | Nair et al. | 1/1 |
| 6,799,299 | B1 * | 9/2004 | Li et al. | 715/235 |
| 6,829,614 | B2 * | 12/2004 | Fujishima et al. | 707/756 |
| 6,848,078 | B1 * | 1/2005 | Birsan et al. | 715/206 |
| 7,143,347 | B2 * | 11/2006 | Su | 715/208 |
| 7,146,565 | B2 * | 12/2006 | Toyama et al. | 715/239 |
| 7,818,665 | B1 * | 10/2010 | Russin et al. | 715/236 |
| 2003/0237047 | A1 * | 12/2003 | Borson | 715/513 |
| 2004/0221264 | A1 * | 11/2004 | Phenix | 717/116 |
| 2007/0169021 | A1 * | 7/2007 | Huynh et al. | 717/136 |
| 2007/0245330 | A1 * | 10/2007 | Lapounov et al. | 717/157 |

OTHER PUBLICATIONS

Ron Person; Special Edition Using Microsoft Excel 97; Dec. 17, 1996; Que Publishing; pp. 385-410.*
Workflow and orchestration tools reduce risks, enforce corporate policy in business automation, Jul. 2004, by David Kumhyr, Master Inventor and Engineer at IBM, http://searchsoa.techtarget.com/news/article, accessed Jun. 17, 2008, 5 pgs.
Towards a Knowledge-based Approach to Semantic Service Composition—2004 (?), by Chen, Shadbolt, Goble, Tao, Cox, Puleston and Smart, 16 pgs.
Towards a workflow management system for service oriented modules—2005 (?), by Salayandia and Gates, Univ. of Texas at El Paso, Int. J. Simulation and Process Modelling vol. x, No. x,xxxx, 14 pgs.

(Continued)

*Primary Examiner* — Doug Hutton, Jr.
*Assistant Examiner* — Andrew Dyer
(74) *Attorney, Agent, or Firm* — Fay Sharpe LLP

(57) ABSTRACT

Systems and methods are described that facilitate validating electronic document conversion chain design in real time, as a designer edits a conversion chain that converts a document collection between formats. Waypoints are inserted into the document conversion chain by associating validation specifications with selected conversion components in the chain. AS the conversion chain is executed on a document collection, the validation specification is executed on all documents in the collection when a selected conversion component is executed. Validation results are returned to indicate to the designer which documents were successfully converted by the component and which were not. The designer can then modify the conversion chain, which is re-executed, and validation results are again presented to the designer for comparison to the pre-modification validation results. The designer can then approve or reject the modification(s) depending on whether document validation is improved thereby.

19 Claims, 5 Drawing Sheets

OTHER PUBLICATIONS

Business Process Execution Language for Web Services Version 1.1—2003—http://download.boulder.ibm.com/ibmdl/pub/software/dw/specs/ws-bpel/ws-boel.pdf, 136 pgs.

Implementing component reuse strategy in complex products environments, Communications of the ACM, Dec. 2007/vol. 50, No. 12, http://portal.acm.org/citation.cfm?id . . . , pp. 63-67.

XProc: An XML Pipeline Language—2007—http://www.w3.org/TR/xproc/, accessed Jun. 26, 2008, 37 pgs.

Requirements for a Workflow System for Grid Service Composition—2005 (?) by Joncheere, Vanderpeeren and Van Der Straeten, SSEL Vrije Universiteit Brussel, 11 pgs.

Relax NG Specification—2001—http://www.oasis-open.org/committees/relax-ng/spec-20011203.html, accessed Jun. 26, 2008, 41 pgs.

Part 3: Rule based language validation—Schematron—ISO/IEC 19757-3 First edition Jun. 1, 2006, http://standards.iso.org/itff/PubliclyAvailable_Standards, 36 pgs.

* cited by examiner

VALIDATION ASSISTED DOCUMENT CONVERSION DESIGN

BACKGROUND

The subject application relates to software development tools and electronic document conversion. While the systems and methods described herein relate to document conversion and the like, it will be appreciated that the described techniques may find application in other software development systems, other document conversion applications, and/or other document and software editing systems.

Generic tools for software development, such as workflow or program editors, Makefiles, another neat tool (ANT), Maven, test units, etc., provide a de facto methodology for the iterative definition of a conversion process. This development methodology consists of loops over three phases (where the third is in practice often underexploited): edition of the process definition (e.g., using a chosen syntax such as ANT, JAVA program, scripting, Makefile, etc., from a functional point of view and define steps of the conversion); test run of the process (e.g., applying the definition through a player to a given set of documents and looking at test results); and validation of the process definition.

Most of the time, the validation relies on a "gold reference" based on user annotations. By comparing the gold reference with the application results, one gets a minimal warranty that at least some reference cases are correctly processed. However, this warranty cannot fully ensure correctness. There are a number of issues and limitations with such a validation methodology, in the particular case of document transformation. For instance, building a gold reference sample is not necessarily feasible until the application has actually been built and stabilized. The gold reference sample is not necessarily representative of the entire collection to process. Moreover, the constraints implied by the gold reference sample do not necessarily reflect the intended target of the application under construction. The cost of building and/or updating a gold reference can be prohibitive as the transformation chain under construction evolves.

In addition, in the particular case of document transformation, this 3-phase methodology requires the application designer to go back and forth between editions that operate at the level of XML nodes, tests that run at collection level, and validation diagnoses that refer to documents. Managing consistently and iteratively those different levels can be tedious, misleading and time consuming.

A general problem in this area is editing workflow, in the context of process implementation through workflow edition. For example, a programmer of a script may not possess the necessary broad knowledge of the workflow definition. The programmer may be eager to code a quick fix, which is not conducive to quality or long-term efficiency. Often, the programmer assumes control over data and assets, which can result in errors and limitations due to a lack of checks and balances and/or peer review. Additionally, a programmer's view may lack sufficient abstraction to create reusable tools. Moreover, scripts often lack deep integration; thus, they lack choreography with other business processes.

Attempts to solve these problems have included characterizing services with respect to their contribution to the target and their potential relationships, so as to guarantee their tight compatibility and their relevance to the application. However, this approach does not give insight on the quality of the conversion chain for a specific document collection.

Alternatively, attempts have been made at providing a knowledge-based approach for service selection or advice with respect to domain specific rules, such as published services in a business process execution language (BPEL) environment where services are associated with semantic descriptions conformant to a shared ontology. Again, this approach operates at the service level and does not consider performance over document collections.

These two alternative approaches may be useful at building time, providing means to statically compile chains upon typed services. Nevertheless, they are not associated with a verification system at runtime, and thus do not provide validation-based assistance at building time or validation and supervision at production time, with a common specification effort. Accordingly, there is an unmet need for systems and/or methods that facilitate overcoming the aforementioned deficiencies.

BRIEF DESCRIPTION

In accordance with various aspects described herein, systems and methods are described that facilitate electronic document conversion design validation. For example, a method of validating a document conversion chain comprises inserting waypoints into a first document conversion chain that converts a document collection from a first format to a second format, executing the first conversion chain on the document collection, and modifying at least one conversion component in the conversion chain to generate a modified conversion chain. The method further comprises re-executing the modified conversion chain on the document collection, and outputting and presenting validation results, for each document in the document collection, for all waypoints in the first conversion chain and the modified conversion chain, to a user for comparison.

According to another feature described herein, an electronic document conversion system comprises a design tool that a user employs to design and edit an initial conversion chain comprising one or more conversion components that act upon documents in a document collection to convert the documents from a first format to a final format, and a continuous builder component that automatically builds the initial conversion chain. The system further comprises a database that stores one or more versions of the documents in the document collection, including initial versions, partially converted intermediate versions, and/or fully converted final versions of the documents. One or more conversion components is designated as a waypoint and is associated with validation specification information that identifies documents in the document collection as being valid or invalid as a function of successful execution of the one or more designated conversion components on the documents.

Yet another feature relates to an apparatus for validating electronic document conversion chain design comprising means for building an initial conversion chain that converts a collection of documents from a first format to a second format, means for designating one or more conversion components as waypoints in the initial conversion chain, each waypoint having a validation specification that determines whether documents have been successfully acted upon by the one or more designated conversion components. The apparatus further comprises means for outputting a graphical representation of the validation results for documents subjected to the initial conversion chain to a user, means for modifying one or more conversion components in the conversion chain, and means for executing the modified conversion chain. Additionally, the apparatus comprises means for executing the validation specification after execution of the modified conversion chain, means for outputting a graphical representation of the validation results for documents subjected to the modified conversion chain to a user for comparison to the validation results of the initial conversion chain, and means for permitting the user to accept or reject the modified conversion chain.

DETAILED DESCRIPTION

In accordance with various features described herein, systems and methods are described that facilitate workflow closely associated with XML document collections. Electronic document conversion design includes defining a process for converting a collection of source documents towards a target schema, where the target schema is conventionally defined externally to the conversion process itself. The conversion design consists in defining step by step the transformation chain that will apply to each document of the source collection.

The systems and methods presented herein describe an integration environment employed to define conversion processes, assisted by a continuous evaluation of the designed transformations. In this manner, assistance is provided for editing Conversion Designs, taking advantage of XML validation mechanisms in a specific context. For instance, rather than simply checking formal syntactic properties as in compiled programming languages, one may validate the designed conversion chain by continuously executing it over a document collection. As the proposed system interprets the designed chain over a document collection and provides the conversion designer corresponding synthetic feedback, it achieves a functional breakthrough by extending the scope of the conversion design edition from the document level to the document collection level.

Figure 1:
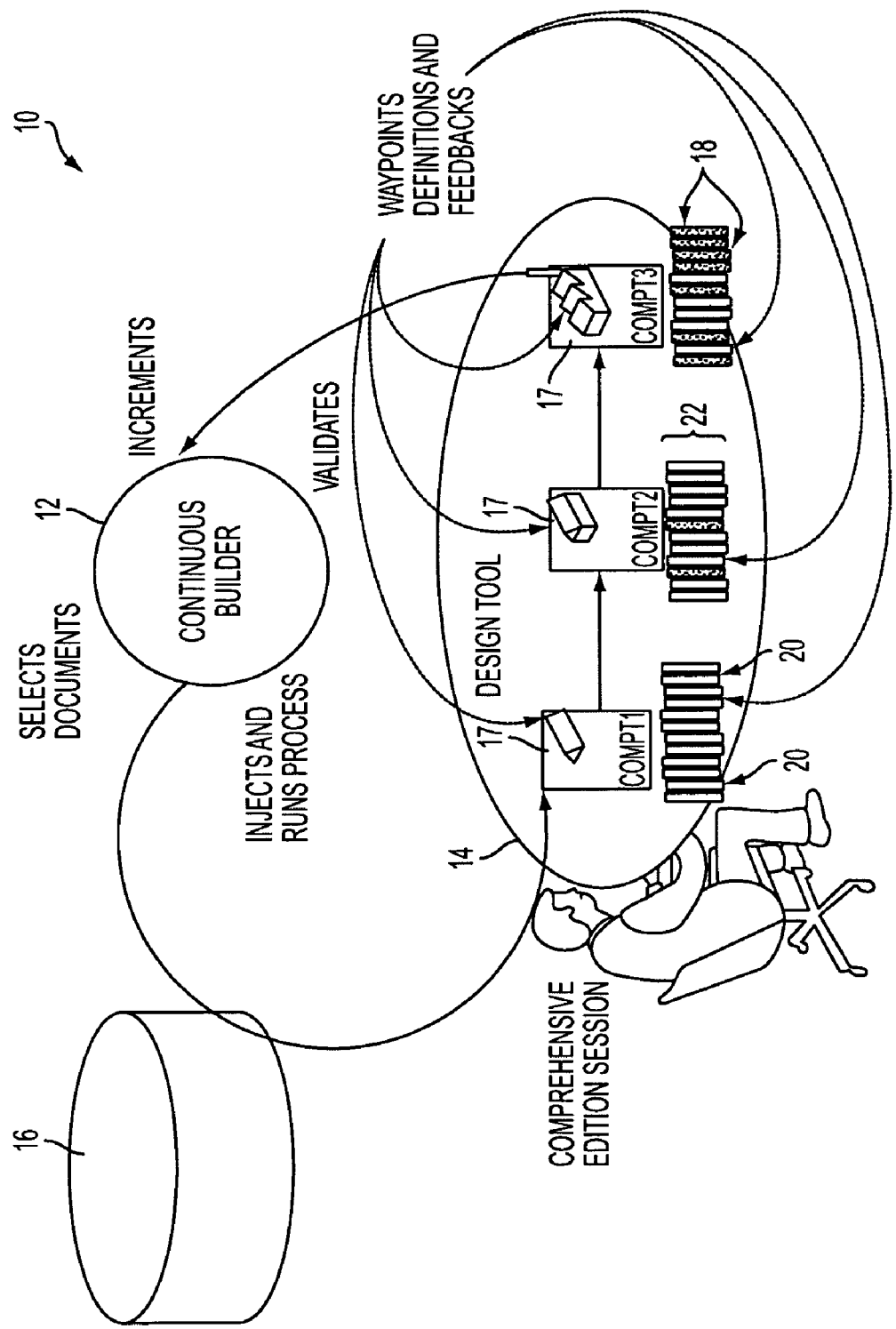
FIG. 1 illustrates a document conversion system that uses waypoints to facilitate document conversion while leveraging power of formal XML-based validation to integrate the validation process at the collection level in the edition phase, so that the execution of test runs and validation proper becomes transparent to an application designer.

With reference to FIG. 1, a document conversion system 10 is illustrated that uses waypoints to facilitate document conversion while leveraging power of formal XML-based validation to integrate the validation process at the collection level in the edition phase, so that the execution of test runs and validation proper becomes transparent to an application designer. The latter two phases (e.g., test runs and validation) are automatically applied over an entire collection of documents each time the conversion chain is edited. In addition, the outcome of the validation is made explicit and visualised in such a way that it assists the application designer in assessing on the fly the impact of any edition of the transformation process.

In the particular case of document transformation, formal validation is defined and checked with XML tools, expressing structural or even semantic constraints with the set of schema formalisms (XSD or Relax), Schematron, or other tools (e.g. XRCE specific RIC syntax).

The system 10 facilitates providing a transparent validation mechanism based on XML resources and tools, which automatically applies conversion chains under design to an entire collection of documents and provides relevant feedback to the conversion designer in an instantaneous and intuitive way through visual interfaces. The system 10 includes a continuous builder 12 that automatically builds a document conversion chain as a user designs the chain. The builder 12 is coupled to a design tool 14, which is employed by the user during an editing session in which the user edits the conversion chain. The system 10 further includes a database 16 that stores information related to conversion chain steps, algorithms, waypoints, editions or versions, documents (pre- and/or post-conversion), and any other information pertinent to executing the methods described herein.

Waypoints 17 are inserted in the conversion chain (e.g., by associating waypoint definitions with specific conversion components or steps), and the builder 12 executes an automatic conversion chain build. The design tool 14 provides visual representations of the in-design chain (e.g., the conversion chain being designed or edited) based on its behavior at the collection level. The design tool 14 further provides a continuous evaluation of document transformation quality by systematically applying the transformation or conversion chain over an input document collection (e.g., stored in the database 16) as the chain is edited. This mechanism is supported by three main technological pieces integrated into the system 10: waypoints 17, the builder 12, and "visualization" provided by the design tool 14.

With regard to waypoints 17, validation specifications are associated with selected nodes (e.g., conversion components or steps) of the transformation path (e.g., the conversion chain). These specifications and associated nodes are hereafter referred to as "waypoints," since they represent coordinates that the transformed documents pass through. The waypoints 17 are seen as part of the transformation chain and can be edited.

The builder 12 continuously executes the conversion chain, even during editing thereof, on the documents of the input collection, checking each waypoint 17 for each document subject to the conversion chain. A "re-execution" of the chain is run after each chain edition (e.g., modification), including waypoint editions (or based on predefined file injection strategies). By default, the distance between a target waypoint and the actual validation of any given document through the particular waypoint is 0 if the document is fully validated, and 1 otherwise. Other more complex distances, for instance, in a [0-1] continuum, can be employed to accommodate a quota of validated criteria, or the number of nodes to be validated, etc.

With regard to visualization, visual feedback is provided by the design tool to translate the collection-wide validation results in a synthetic visualization based on document distances to the waypoints. In the figure, bars representing invalid documents 18 are hashed, and bars representing valid documents 20 associated validated documents are not hashed. In one embodiment, invalid documents (e.g., documents in the collection for which a particular conversion component or step could not be successfully executed) bars are red, and validated document (e.g., documents in the collection for which a particular conversion step or component was successfully executed) bars are green, to provide an easily assessable graphical representation to the user. Other colors or gradients thereof can be employed to increase granularity of the system in order to show levels of validation, and the like. Other visualization mechanisms can be employed as well, including those aimed at efficiently reflecting large amount of numerical or structural data.

According to an example, the builder 12 feeds input collection documents into an execution and/or validation engine (not shown) in the design tool 14. Processing sessions are handled in a comprehensive edition session in the design tool 14. The chain, tests, and validations are executed transparently to the user, and results are reported by the design tool 14. Chain modification within the design tool 14 triggers re-execution of the relevant parts of the chain to update feedback and the graphical representations 22 associated with each waypoint 17. The design tool 14 reviews validation logs provided by the incremental builder 12 and renders them at collection level on a flow diagram or the like. In this manner, processing sessions or steps that were previously (e.g., in conventional methods and systems) performed externally to conventional design tools are instead performed in the described design tool 14, transparent to the user.

For instance, in a conventional system, a designer builds a chain, runs it on a number of reference documents, and checks the outputs. Processing sessions and actions are performed externally to the design tool, and may include initial document collection, document collection after each of one or more conversion chain components are executed, partial execution sessions (performed by the user), partial validation sessions (performed by the user), transformed collection validation (performed by the user), and the like.

The designer tool 14 provides a means to associate validations with steps. Considering a conversion chain or process as a path from the source collection to the target, or transformed collection, it is possible to provide along the path multiple waypoints to assert certain properties of the data flow. The XML format offers standard waypoint definition languages in various validation formats. From a conversion perspective, these waypoints can be managed in waypoint libraries to contribute to future conversion processes. Consideration of waypoints can facilitate identifying particular roles various conversion chain components play in a document conversion project.

For example, some waypoints may be provided by a project analyst, such as in a target schema, including collection-specific structural characteristics and their order of appearance in the conversion chain. For example, a first waypoint can be associated with a node or conversion component that performs validation of pages with numbers, a second waypoint is associated with a conversion component for validation of chapters, a third waypoint with validation of sections, etc. The conversion designer can then implement or insert steps from waypoint to waypoint.

In a related example, waypoints come from specific domain standards, or may be provided by domain ontology. These waypoints may be collected by the project analyst but provided by a given community.

Other waypoints are provided by components providers, to characterize general properties of component input/output. The conversion designer selects the appropriate waypoints packaged with the component, depending on the component parameters used in the conversion chain.

Still other waypoints are provided by the conversion project leader, to characterize expectations at the project level. The conversion designer can then ensure that these points are reached at given steps in the conversion chain from a project management point of view.

Other waypoints can be provided by the conversion designer, to structure a specific implementation of the conversion. These waypoints aim at supporting configuration management and incremental development of a conversion project.

Moreover, in a production environment, the chain lifecycle can be managed through waypoints related, for example, to testing and deployment, support requests/bug reports, non-regression/migration, etc. In addition, a library of waypoints can also be managed across conversion projects for reuse.

Still referring to FIG. 1, the builder 12 can execute a background validation "build" at the document collection level, including parallel processing of the conversion chain, also run at collection level, transparent to the user during an editing session. Waypoints are evaluated all along the chain for collection documents to assess the correctness of the chain definition. Waypoints can be similar compilation rules in-lined within the chain. An injection mechanism can be included in the project configuration to tune the input flow from the document collection depending on the maturity of the chain. Reference documents are also configurable, and annotated documents can be included to realize the first attempts of a given step in the chain or path. When satisfied at a unitary level (e.g., a restricted number of input documents), then a more formal view can be generated through waypoint evaluation and collection width (e.g., the number of documents in a collection being converted).

Additionally, when addressing the collection width at a given step, the background validation build can be run remotely, such as when the collection is stored on a grid machine or the like. Additionally or alternatively, the cache of intermediate results and waypoint validations is continuously managed through a chain execution engine (not shown) in the design tool 14, as a function of chain changes and injection of new input files.

With regard to visualization, an example of a visual return effect relates to providing, for each validation file, (e.g., an XSD file, a regular language description for XML (RELAX) schema, a Schematron specification, a Reference Integrity Constraint (RIC) file, etc.), a visual gauge 22 with one line space per processed file. Lines can be color-coded in the gauge (sized to the document number in the collection), e.g. a green bar or line if validated or red if not validated. In a related example, dark green is used if validation constraints are heavy, light green otherwise. Red darkness can be adjusted to indicate error severity, if provided in the validation file. For example, lines 18 and 20, which are shown as hashed or unhashed bars, can be color-coded according to this example. The user can then see the lines appearing in the gauge with a given color, and contiguous lines of the same color can be merged to appear as a block in an average color.

Other types of visualisation can naturally be employed, provided they give the conversion designer visual clues on how the chain performs over the source collection. For instance, cluster visualization based on the document collection behavior through the various waypoints can be employed.

The visual indicators assist the conversion designer in evaluating the impact of an editing action with respect to his/her expectations at the document collection level. For instance, with the first visualization example above, the optimal goal for the chain design is that all document waypoints be green over the entire collection. An advantage of this approach is that the design target matches the production target, and that the same design tooling may be used for supervision in the production environment.

Since document conversion is realized through XML processing, and because XML validation is orthogonal to XML processing, it becomes very easy and productive to implement such a system. The design tool 14 thus increases efficiency in re-doing similar projects, but moreover, facilitates transferring some of the roles that are conventionally carried out by component designers towards services staff in charge of customer conversion projects. To do so, this system 10 provides several advantages and perspectives: control over data assets definition is transversal to processing steps definition; the designer concentrates on edition tasks, and does not need to switch to test run mode or to validation analysis tools; the designer receives continuous feedback on his/her actions with respect to validation of the full document collection, so there is no need to work with a reference document for setting up a conversion process; as a cornerstone of the building phase, formal validation is kept in the process definition, and the runtime execution inherits the same data control without additional effort. Moreover, replacing steps within an existing conversion process is facilitated by the associated validations. Validations are persistent, and they support upgrades with respect to the basic conversion component lifecycle. Additionally, the system 10 facilitates navigating on failing documents within a collection, clustering documents based on such techniques, component characterization, etc.

With respect to the comparison of two "in-design" chains (e.g., two chains being designed), providing an instantaneous collection-wide quality view to lead the conversion designer in making good decisions can be augmented in situations where intermediate or ancillary modifications to the chain under development do not improve its overall quality and actually do not require a validation. The improvement resulting from a full sequence of modifications eventually needs to be assessed, which is facilitated by preserving the context of the initial chain in order to compare its performance to the modified chain, and possibly restore it if expected improvements are not achieved or realized.

Once waypoints have been inserted into the conversion chain, distance between processed documents and corresponding waypoints, and hence between document collections (or conversion paths) and waypoints can be determined by the design tool 10. When a satisfactory distance evaluation between a document collection's conversion path and an ideal target path defined by a sequence of waypoints is achieved, a number of steps can be employed to optimally navigate through waypoints. For instance, providing relative distances or positions between the actual performance of specific steps and target waypoints; positioning candidate components for a next step based on an anticipated improvement they will bring; executing with exception handling, based on distance evaluation (e.g., if distance to target is greater than previous distance, revert to previous state); letting the system find the correct components and parameters for each document, based on a determined distance reduction at each step; etc.

Figure 2:
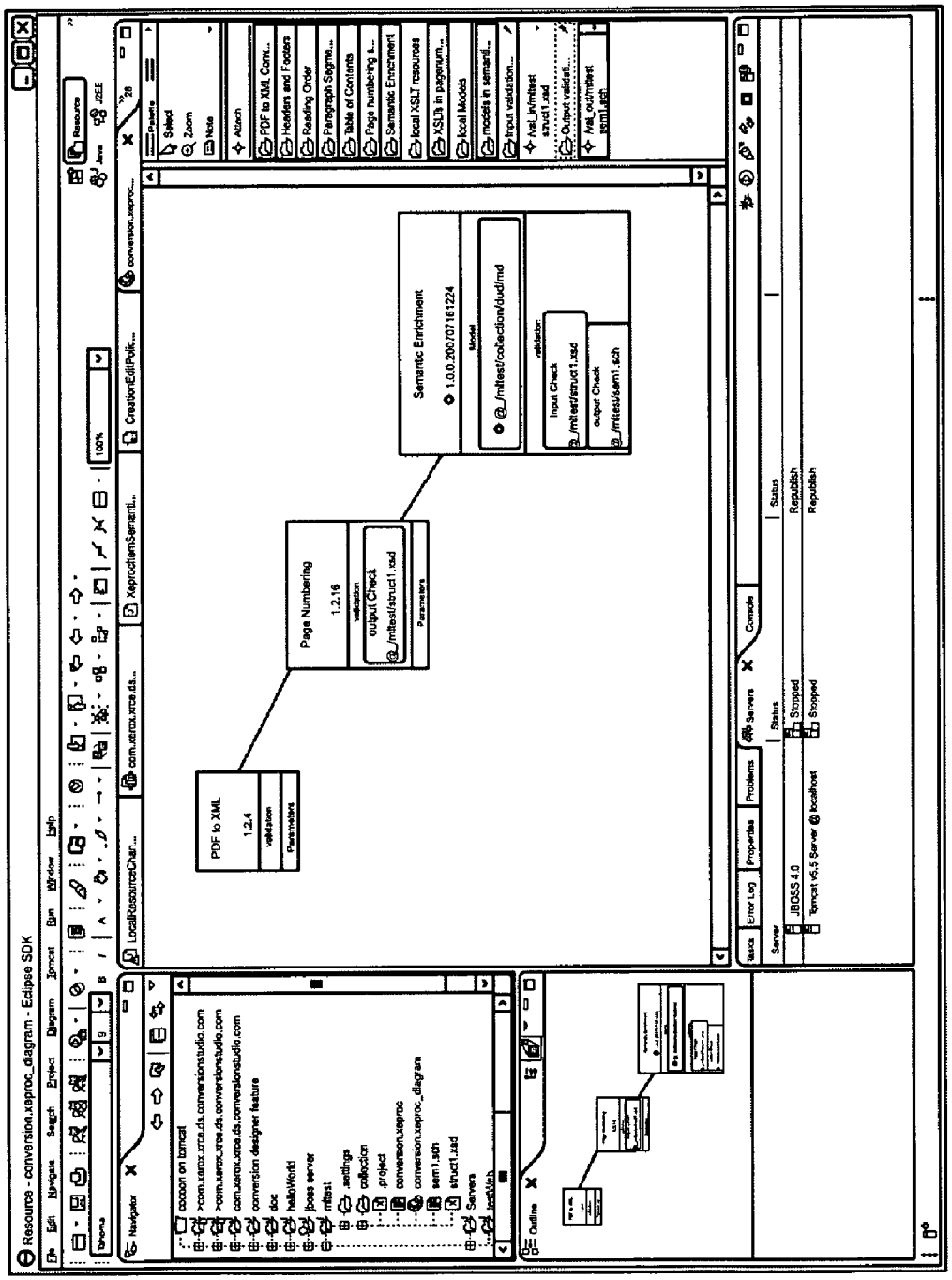
FIG. 2 illustrates a screenshot showing an example of an interface with which a user receives and inputs information.

FIG. 2 illustrates a screenshot 26 showing an example of an interface with which a user receives and inputs information. The interface is a workflow graphical editor, such as Conversion Studio Designer, able to define a sequence of conversion steps, called a xeproc. The xeproc conversion model defines each step as a call to a conversion component (e.g., a conversion algorithm, software module, or the like stored on a computer-readable medium), consuming as input an XML document and producing an output XML document. A subsequent step or component takes this output as an input. This is also known as a pipeline. Steps in such a xeproc pipeline can include: generic conversion components such as header/footer detection, reading order, segmentation, "table of contents" detection, page numbering, machine learners (e.g., with a play function); Extensible Stylesheet Language Transformation (XSLT) style sheets; collection-based machine-learned models; etc.

As shown in FIG. 2, each step of the xeproc design may be decorated with one or more input and output validation specifications. An associated xeproc engine (not shown) applies these validation controls respectively, either before playing (e.g., executing) the step component or after. For instance, the design elaboration in the screenshot 26 comprises three steps, and shows the controls associated with the third step (e.g., the expected document semantic enrichment) through Schematron rules. The same validation can be attached to the output of one step and the input of the next step to prevent inconsistency resulting from changes due to the potential insertion of intermediate preprocessing steps.

According to an example, an ECLIPSE builder (not shown) processes documents in a source collection with the xeproc engine and the current in-design. The system can then continuously feed the source documents to the pipeline. Additionally, a graphical rendering of validation results associated with each validation definition and its graphic representation can be provided. The system continuously updates the representation of the validation status for each waypoint, inserting each validation result into the corresponding waypoint gauge. The continuous build process can be exported to grid architecture, if performance issues are a concern.

Figure 3:
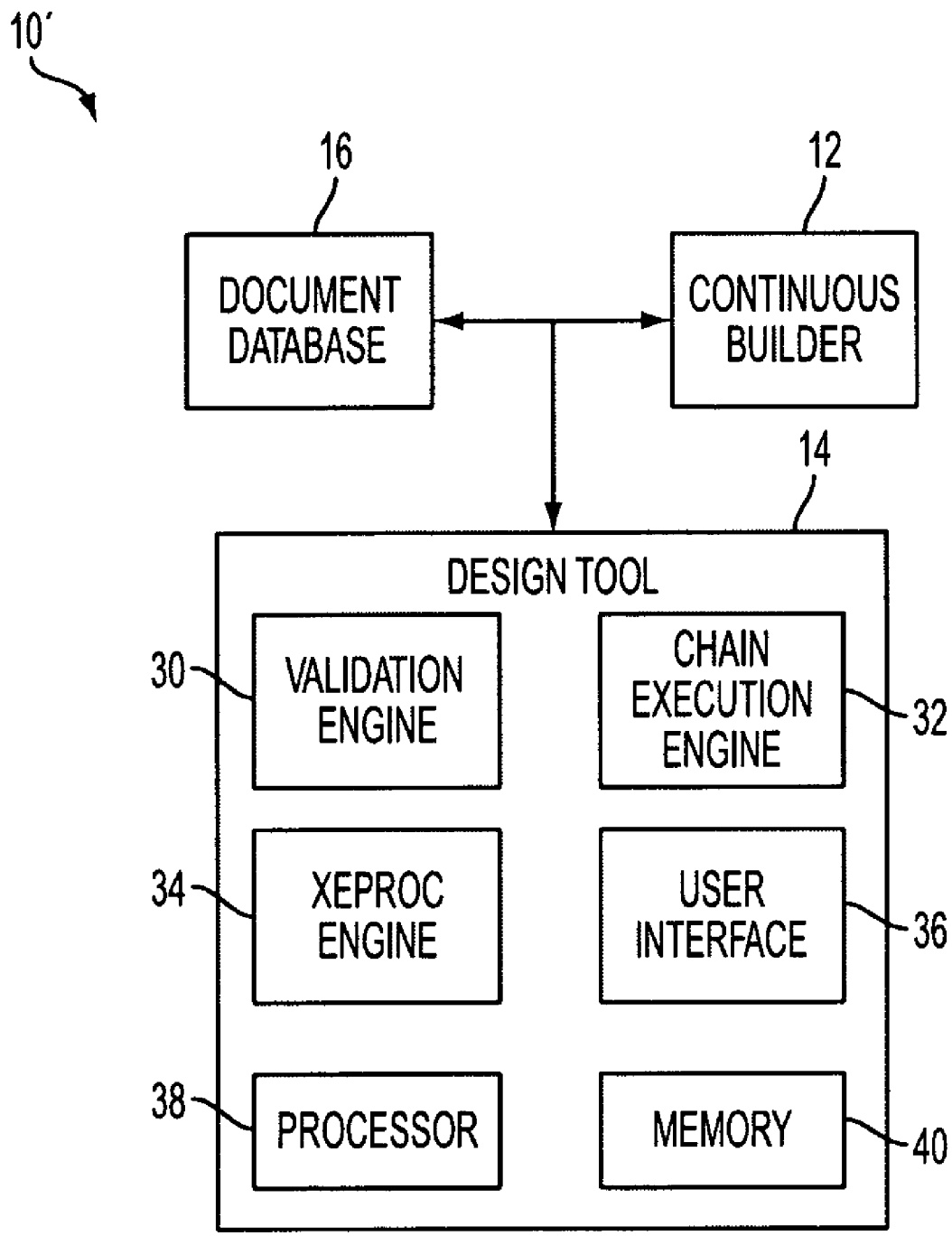
FIG. 3 illustrates a system for validating collections of documents using waypoints, in accordance with various aspects described herein.

FIG. 3 illustrates a system 10' for validating collections of documents using waypoints, in accordance with various aspects described herein. The system 10' comprises a continuous builder 12, a design tool 14, and a document database 16. The design tool 14 comprises a validation engine 30, a chain execution engine 32, a xeproc engine 34, a user interface 36, a processor 38, and a memory 40. It will be appreciated that in some embodiments the conversion chain execution engine 32 and the xeproc engine 34 are the same component, and are responsible for execution of the conversion chain on a document collection. The builder 12 automatically builds a document conversion chain as a user designs the chain using the user interface 36 of the design tool 14. The user interface may be, for example, a computing device with a graphical user interface (GUI) and one or more input devices (e.g., keyboard, mouse, stylus, microphone, etc.). The user edits the conversion chain built by the builder using the user interface, and inserts waypoints into the conversion chain. Each waypoint is associated with a conversion step, or node, and is monitored by the validation engine 34 during execution of the conversion chain on a document collection by the chain execution engine 32. If one or more of the documents in the collection fails a particular conversion step that is associated with a waypoint, then the waypoint is flagged and an alert is provided to the user via the user interface 36.

In one embodiment, the user is presented with multiple representations of waypoint validation indications. For instance, the user can be presented with a first set of graphical representations indicating valid/invalid document status for a each of a plurality of waypoints associated with respective conversion components in the conversion chain, and a second set of graphical representations indicating valid/invalid document status for a each of the plurality of waypoints after modification to and execution of one or more of the conversion components associated therewith. The user then compares the graphical representations for each waypoint to assess the effectiveness of the modification thereto. If a modification to a given conversion component results in an increase of invalid documents, then the user can revert to the original conversion component configuration. If the modification to the given conversion component results in an increase of valid documents, then the user can save the new conversion component configuration and move on to another conversion component to improve a document validity level therefor.

The processor 38 executes, and the memory 40 stores, computer-executable instructions for carrying out any and all of the various functions for performing the various acts and/or methods described herein. For instance, such instructions can comprise, without being limited to: instructions for receiving user input and presenting feedback and other output information to the user via the user interface 36; for interacting with and/or controlling the builder 12, the database 16, and/or other components of the design tool 14; for triggering a re-execution of a conversion chain on a document collection upon modification or edits to one or more conversion components in the chain during an editing session; for making inferences or suggestions to a user regarding modifications to one or more conversion components to improve success rates across the conversion chain; and any other suitable instructions for providing the functionality described herein. In another embodiment, the memory 40 stores pre-modification and post-modification editions or versions of the conversion chain(s) for a given document collection.

Figure 4:
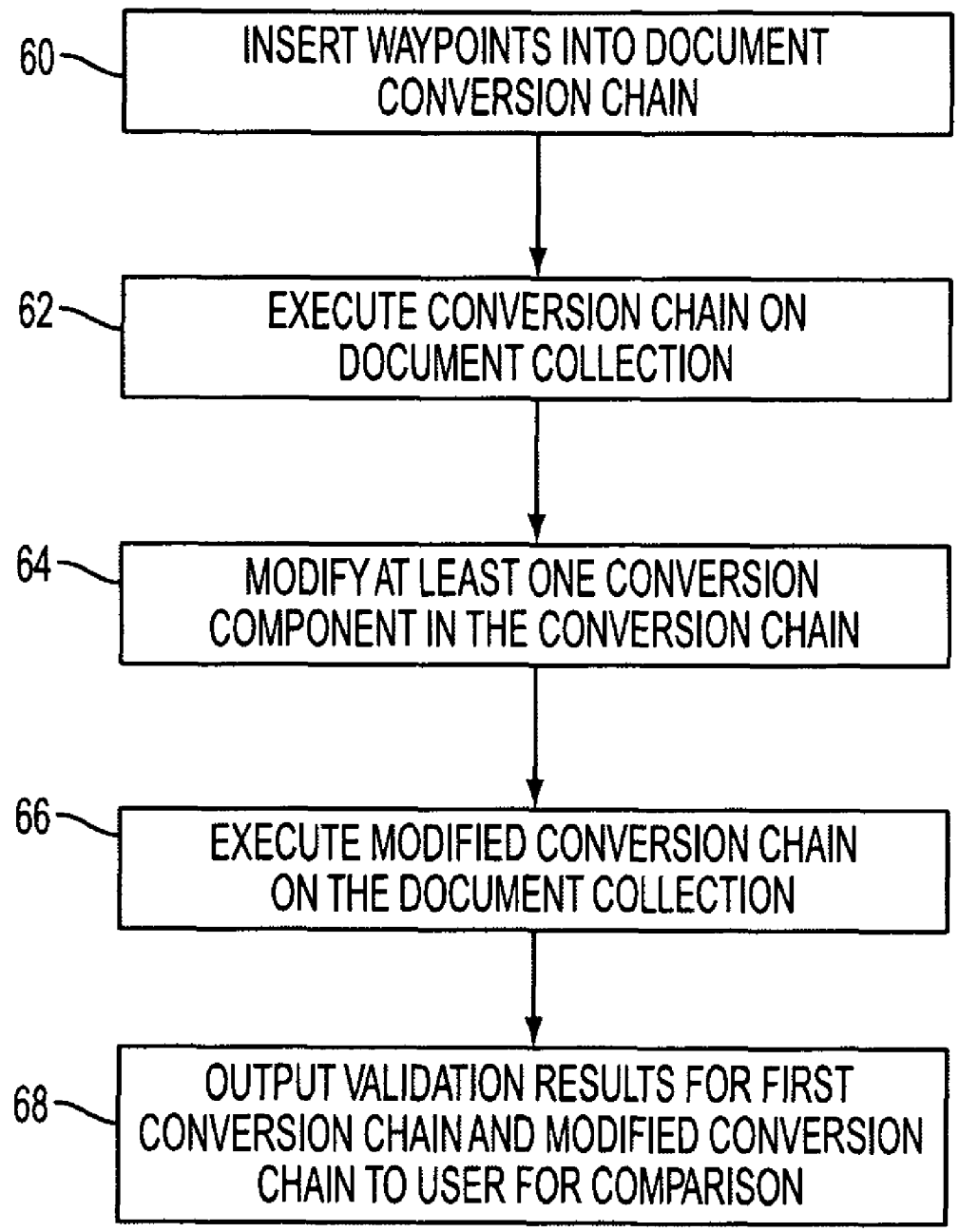
FIG. 4 illustrates a method for modifying a document conversion chain and outputting pre- and post-modification document validation results to a user for comparison in order to assess the effectiveness of the modification(s), in accordance with various aspects.
Figure 5:
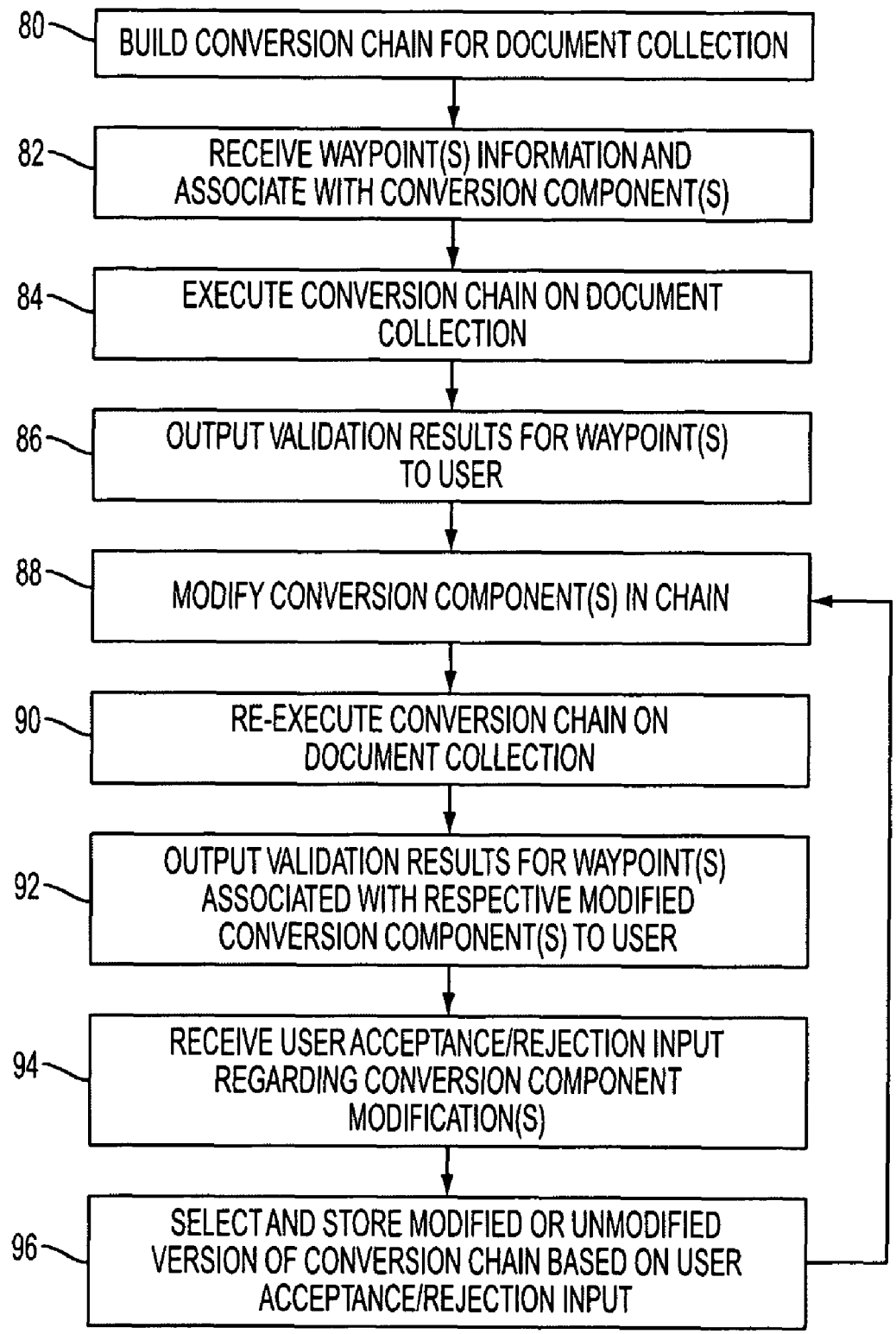
FIG. 5 illustrates a method for providing validation results to a user for pre- and post-modification conversion chains for comparison.

FIGS. 4 and 5 illustrate methods related to using waypoints to validate document conversion at the document collection level, in accordance with various features. While the methods are described as a series of acts, it will be understood that not all acts may be required to achieve the described goals and/or outcomes, and that some acts may, in accordance with certain aspects, be performed in an order different that the specific orders described.

FIG. 4 illustrates a method for modifying a document conversion chain and outputting pre- and post-modification document validation results to a user for comparison in order to assess the effectiveness of the modification(s), in accordance with various aspects. At 60, waypoints are inserted in to a document conversion chain. At 62, the conversion chain is executed on multiple documents in a document collection. At 64, at least one conversion component in the conversion chain is modified. The modified conversion chain is executed at 66. At 68, validation results for the initial conversion chain and the modified conversion chain are output for all documents in the document collection. The user then compares the validation results to determine whether the modification(s) improved document conversion efficacy or whether the modification(s) should be rejected. In this manner, the user (e.g., a conversion chain designer or the like) can receive real-time feedback pertaining to conversion chain building or modification, and can adjust the conversion chain design accordingly rather than laboriously plodding through multiple debugging sessions, etc.

FIG. 5 illustrates a method for providing validation results to a user for pre- and post-modification conversion chains for comparison. At 80, a conversion chain for a document collection is built. Building the conversion chain can be performed manually, automatically, or semi-automatically. Waypoint information is received at 82 and associated with one or more conversion components. For instance, a user can designate one or more conversion components (e.g., nodes or steps in the conversion chain) as waypoints for monitoring progress of the conversion of the document collection. In another embodiment, waypoints are automatically designated, for instance by dividing the conversion chain into equal or substantially equal segments (e.g., in duration, in number of steps or components, etc.).

At 84, the conversion chain is executed on the document collection (e.g., documents in the collection are converted from one format to another). At 86, validation results are output to the user for review. For instance, "validation" of a document at each waypoint indicates that the conversion component associated with the waypoint was, or that all conversion components up to the waypoint were, successfully executed on the document. For example, a graphical representation showing document status for documents in the collection can include a series of bars that are color-coded or otherwise differentiated to indicate whether a given document has been successfully operated upon by a conversion component(s) associated with the waypoint or whether the document is invalid or otherwise has not been successfully operated upon by the conversion component(s).

At 88, a user or program modifies one or more conversion components in the conversion chain. At 90, the conversion chain is re-executed or rerun with the modified conversion component(s). At 92, validation results are output for the modified chain in a manner similar act 86. A user can then compare validation results for the original or pre-modification conversion chain to the results for the modified chain. Input related to user acceptance or rejection of the modification is received at 94. If the results are improved (e.g., more documents are valid after the modification), then the user can accept the modified chain, which is stored at 96, after which the method reverts to 88 for reiteration using the stored modified chain as the "original" chain for further refinement. Alternatively, the user can reject the modification if validation results are worsened by the modification, in which case the modified chain can be discarded and the pre-modification chain is stored or saved at 96. In another embodiment, the rejected modified chain is stored for future reference, analysis, etc.

Once the user is satisfied that the conversion chain is sufficiently refined (e.g., all documents are successfully converted and/or valid at each waypoint), the method is terminated.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of validating a document conversion chain, comprising:

inserting a plurality of waypoints into a first document conversion chain that converts a markup-language document collection from a first format to a second format, wherein the first document conversion chain contains at least one conversion component;

executing the first conversion chain on the document collection to create a first modified document collection;

modifying the at least one conversion component in the first conversion chain to generate a second conversion chain, wherein the plurality of waypoints are maintained;

executing the second conversion chain on the document collection to create a second modified document collection;

generating validation results for each document in the first and second modified document collections at each waypoint in the first conversion chain and the second conversion chain; and presenting the validation results to a user;

comparing the validation results of each document in the first modified document collection to the validation results of each document in the second modified document collection.

2. The method of claim 1, further comprising associating a waypoint with the at least one conversion component in the conversion chain.

3. The method of claim 2, wherein the validation results comprise a document status for each document in the document collection, wherein each document is indicated as being valid if the conversion component associated with the waypoint was successfully executed on the document, and invalid otherwise.

4. The method of claim 3, wherein the validation results are presented to the user graphically.

5. The method of claim 4, wherein the validation results are color-coded, using different colors for valid an invalid documents, respectively.

6. The method of claim 3, further comprising receiving user input regarding the acceptance or rejection of the second conversion chain upon review of the validation results.

7. The method of claim 6, further comprising discarding the second conversion chain and reverting to the first conversion chain upon receiving user input indicating user rejection of the second conversion chain.

8. The method of claim 6, further comprising storing the second conversion chain for analysis and reverting to the first conversion chain upon receiving user input indicating a rejection of the second conversion chain.

9. The method of claim 6, further comprising storing the second conversion chain upon receiving user input indicating user acceptance of the second conversion chain, and iteratively performing conversion component modification, execution of newly modified conversion chains and validation results output for user comparison.

10. A system for validating a document conversion chain, comprising:
   a processor;
   a program module for inserting a plurality of waypoints into a first document conversion chain that converts a markup-language document collection from a first format to a second format, wherein the first document conversion chain contains at least one conversion component;
   a program module for executing the first conversion chain on the document collection to create a first modified document collection;
   a program module for modifying the at least one conversion component in the first conversion chain to generate a second conversion chain, wherein the plurality of waypoints are maintained;
   a program module for executing the second conversion chain on the document collection to create a second modified document collection;
   a program module for generating validation results for each document in the first and second modified document collections at each waypoint in the first conversion chain and the second conversion chain; and
   a program module for presenting the validation results to a user;
   a program module for comparing the validation results of each document in the first modified document collection to the validation results of each document in the second modified document collection.

11. The system of claim 10, further comprising associating a waypoint with the at least one conversion component in the conversion chain.

12. The system of claim 11, wherein the validation results comprise a document status for each document in the document collection, wherein each document is indicated as being valid if the conversion component associated with the waypoint was successfully executed on the document, and invalid otherwise.

13. The system of claim 12, wherein the validation results are presented to the user graphically.

14. The system of claim 13, wherein the validation results are color-coded, using different colors for valid an invalid documents, respectively.

15. The system of claim 14, further comprising a program module for receiving user input regarding the acceptance or rejection of the second conversion chain upon review of the validation results.

16. The system of claim 15, further comprising discarding the second conversion chain and reverting to the first conversion chain upon receiving user input indicating user rejection of the modified conversion chain.

17. The system of claim 15, further comprising storing the second conversion chain for analysis and reverting to the first conversion chain upon receiving user input indicating a rejection of the second conversion chain.

18. The system of claim 15, further comprising storing the second conversion chain upon receiving user input indicating user acceptance of the second conversion chain, and iteratively performing conversion component modification, execution of newly modified conversion chains and validation results output for user comparison.

19. A non-transitory computer-readable medium for validating a document conversion chain, comprising:
   a program module for inserting a plurality of waypoints into a first document conversion chain that converts a markup-language document collection from a first format to a second format, wherein the first document conversion chain contains at least one conversion component;
   a program module for executing the first conversion chain on the document collection to create a first modified document collection;
   a program module for modifying the at least one conversion component in the first conversion chain to generate a second conversion chain, wherein the plurality of waypoints are maintained;
   a program module for executing the second conversion chain on the document collection to create a second modified document collection;
   a program module for generating validation results for each document in the first and second modified document collections at each waypoint in the first conversion chain and the second conversion chain; and
   a program module for presenting the validation results to a user;
   a program module for comparing the validation results of each document in the first modified document collection to the validation results of each document in the second modified document collection.

* * * * *